(12) United States Patent
Numada et al.

(10) Patent No.: US 12,519,335 B2
(45) Date of Patent: Jan. 6, 2026

(54) SECONDARY BATTERY SYSTEM

(71) Applicant: SANYO Electric Co., Ltd., Kadoma (JP)

(72) Inventors: Naoki Numada, Osaka (JP); Kei Kobayashi, Osaka (JP)

(73) Assignee: Panasonic Energy Co., Ltd., Osaka (JP)

( * ) Notice: Subject to any disclaimer, the term of this patent is extended or adjusted under 35 U.S.C. 154(b) by 579 days.

(21) Appl. No.: 17/913,781

(22) PCT Filed: Mar. 24, 2021

(86) PCT No.: PCT/JP2021/012183
§ 371 (c)(1),
(2) Date: Sep. 22, 2022

(87) PCT Pub. No.: WO2021/200444
PCT Pub. Date: Oct. 7, 2021

(65) Prior Publication Data
US 2024/0106257 A1    Mar. 28, 2024

(30) Foreign Application Priority Data
Mar. 30, 2020    (JP) ................................. 2020-059688

(51) Int. Cl.
*H02J 7/00*    (2006.01)
(52) U.S. Cl.
CPC ........ *H02J 7/00718* (2020.01); *H02J 7/0048* (2020.01); *H02J 7/007184* (2020.01)
(58) Field of Classification Search
CPC ................. H02J 7/00718; H02J 7/0048; H02J 7/007184; H02J 7/00712; H01M 10/0525;
(Continued)

(56) References Cited

U.S. PATENT DOCUMENTS

| 5,537,390 | A  | * | 7/1996 | Horiba | .................. | H01M 10/48 320/DIG. 21 |
| 9,960,458 | B2 | * | 5/2018 | Weicker | .................... | H02J 7/34 |

(Continued)

FOREIGN PATENT DOCUMENTS

| EP | 3016235 A1 | * | 5/2016 | .............. B60L 50/64 |
| JP | 2013-196805 A |   | 9/2013 | |

(Continued)

OTHER PUBLICATIONS

Extended (Supplementary)European Search Report dated Sep. 1, 2023, issued in counterpart EP Application No. 21781851.7. (7 pages).

(Continued)

*Primary Examiner* — Jared Fureman
(74) *Attorney, Agent, or Firm* — WHDA, LLP

(57) ABSTRACT

A secondary battery system according to one aspect of the present disclosure comprises: an electric load connected to a secondary battery; and a control device which, in an SOC-dV/dQ curve in which the dV/dQ that is the differential value of the change amount dV of the voltage V of the secondary battery with respect to the change amount dQ of the capacity Q of the secondary battery is plotted with respect to the charged state (SOC) expressed as a percentage of the capacity Q with respect to the fully charged capacity of the secondary battery, when at least one peak top SOC range including the peak top charge rate is set, and charging or discharging stops in the peak top SOC range, discharges the secondary battery by the electric load to avoid the peak top SOC range and ends charging or discharging of the secondary battery.

2 Claims, 7 Drawing Sheets

(58) Field of Classification Search
CPC .... H01M 10/448; H01M 10/48; H01M 10/44; Y02E 60/10
See application file for complete search history.

(56) References Cited

U.S. PATENT DOCUMENTS

| | | | | |
|---|---|---|---|---|
| 11,309,720 | B2* | 4/2022 | Ito | H01M 10/425 |
| 11,536,772 | B2* | 12/2022 | Du | H02J 7/0048 |
| 2011/0012604 | A1* | 1/2011 | Tsujiko | H01M 4/5825 |
| | | | | 324/427 |
| 2011/0309798 | A1* | 12/2011 | Hara | H01M 10/0525 |
| | | | | 429/211 |
| 2012/0226455 | A1* | 9/2012 | Kumashiro | H01M 10/48 |
| | | | | 702/63 |
| 2013/0119940 | A1* | 5/2013 | Iriyama | H01M 10/44 |
| | | | | 320/134 |
| 2016/0149420 | A1 | 5/2016 | Sasaki | |
| 2016/0233461 | A1 | 8/2016 | Young et al. | |
| 2016/0254687 | A1* | 9/2016 | Tanaka | H01M 10/425 |
| | | | | 320/112 |
| 2017/0371000 | A1* | 12/2017 | Fukushima | H02J 7/0013 |
| 2018/0212458 | A1* | 7/2018 | Kawai | H01M 50/204 |
| 2018/0269540 | A1* | 9/2018 | Tanaka | H02J 7/0068 |
| 2019/0044345 | A1* | 2/2019 | Komiyama | H02J 7/00712 |
| 2019/0195956 | A1* | 6/2019 | Lim | H01M 10/4207 |
| 2020/0099235 | A1 | 3/2020 | Ito et al. | |
| 2020/0122590 | A1 | 4/2020 | Ko | |
| 2020/0212511 | A1* | 7/2020 | Adachi | H02J 7/007182 |
| 2022/0146590 | A1* | 5/2022 | Asai | H01M 10/0525 |

FOREIGN PATENT DOCUMENTS

| | | | | |
|---|---|---|---|---|
| JP | 5779528 | B2 * | 9/2015 | |
| JP | 2016015820 | A * | 1/2016 | |
| JP | 2018041529 | A * | 3/2018 | H01M 10/052 |
| WO | 2013/157132 | A1 | 10/2013 | |
| WO | 2015/080285 | A1 | 6/2015 | |
| WO | 2016/120917 | A1 | 8/2016 | |
| WO | WO-2019177274 | A1 * | 9/2019 | B60K 1/04 |
| WO | WO-2019230464 | A1 * | 12/2019 | G01R 31/378 |
| WO | WO-2021191993 | A1 * | 9/2021 | G01R 31/387 |

OTHER PUBLICATIONS

Office Action dated Dec. 2, 2022, issued in counterpart IN application No. 202247054283. (4 pages).

International Search Report dated Jun. 15, 2021, issued in counterpart application No. PCT/JP2021/012183 (English translation).

PCT/ISA/237 Written Opinion of the International Searching Authority dated Jun. 15, 2021, issued in counterpart application No. PCT/JP2021/012183.

Office Action dated Oct. 16, 2025, issued in counterpart CN Application No. 202180022745.6, with partial English translation. (14 pages).

* cited by examiner

SECONDARY BATTERY SYSTEM

CROSS REFERENCE TO RELATED APPLICATIONS

This Application is the National Stage of International Application No. PCT/JP2021/012183, filed Mar. 24, 2021, which claims priority from Application No. 2020-059688 filed on Mar. 30, 2020 in Japan. The entire contents of these applications are incorporated herein by reference in their entirety.

TECHNICAL FIELD

The present disclosure relates to a secondary battery system.

BACKGROUND

In secondary batteries, it is known that deterioration is promoted when charging/discharging of the secondary battery is stopped at a peak top (a peak) on a Q-dV/dQ curve and the secondary battery is left in this state. The Q-dV/dQ curve is a curve showing a relationship between dV/dQ which is a differential value of an amount of change dV of a voltage V of the secondary battery with respect to an amount of change dQ of a capacity Q, and a value of the capacity Q. Patent Literature 1 discloses a secondary battery system in which a state of charge ("SOC") is set for each of a starting end and a completion end of a charge/discharge cycle while avoiding the peak top in advance.

CITATION LIST

Patent Literature

PATENT LITERATURE 1: JP 2013-196805 A

SUMMARY

Technical Problem

In the secondary battery system of Patent Literature 1, the SOCs for the starting end and the completion end of the charge/discharge cycle are simply set. For example, when a user stops the charging or discharging at the peak top which exists between the starting end and the completion end, the deterioration of the secondary battery is promoted. In addition, when the charge/discharge cycle is set in such a manner that the peak top does not exist between the SOCs of the starting end and the completion end, a battery capacity is significantly reduced.

An advantage of the present disclosure lies in provision of a secondary battery system in which charging and discharging can be controlled so as to avoid an SOC in which a completion end of charging and discharging is the peak top.

Solution to Problem

According to one aspect of the present disclosure, there is provided a secondary battery system including: a secondary battery having an electrode assembly in which a positive electrode plate and a negative electrode plate are layered with a separator therebetween, and a non-aqueous electrolyte; an electric load connected to the secondary battery; and a control device that completes, when at least one peak top SOC range which includes a state of charge (SOC) which is a peak top is set on an SOC-dV/dQ curve on which dV/dQ, which is a differential value of an amount of change dV of a voltage V of the secondary battery with respect to an amount of change dQ of a capacity Q of the secondary battery, is plotted against the SOC which is expressed as a percentage of the capacity Q with respect to a capacity of the secondary battery in a fully charged state, and when charging of discharging is to be stopped in the peak top SOC range, the charging or the discharging of the secondary battery while avoiding the peak top SOC range by discharging the secondary battery with the electric load.

According to another aspect of the present disclosure, there is provided a secondary battery system including: a secondary battery having an electrode assembly in which a positive electrode plate and a negative electrode plate are layered with a separator therebetween, and a non-aqueous electrolyte; an auxiliary battery connected to the secondary battery; and a control device that completes, when at least one peak top SOC range which includes a state of charge (SOC) which is a peak top is set on an SOC-dV/dQ curve on which dV/dQ, which is a differential value of an amount of change dV of a voltage V of the secondary battery with respect to an amount of change dQ of a capacity Q of the secondary battery, is plotted against the SOC which is expressed as a percentage of the capacity Q with respect to a capacity of the secondary battery in a fully charged state, and when charging or discharging is to be stopped in the peak top SOC range, the charging or the discharging of the secondary battery while avoiding the peak top SOC range by charging the secondary battery with the auxiliary battery.

Advantageous Effects

According to an aspect of the present disclosure, charging and discharging can be controlled to avoid an SOC in which a completion position of the charging or discharging is the peak top.

DESCRIPTION OF EMBODIMENTS

Figure 1:
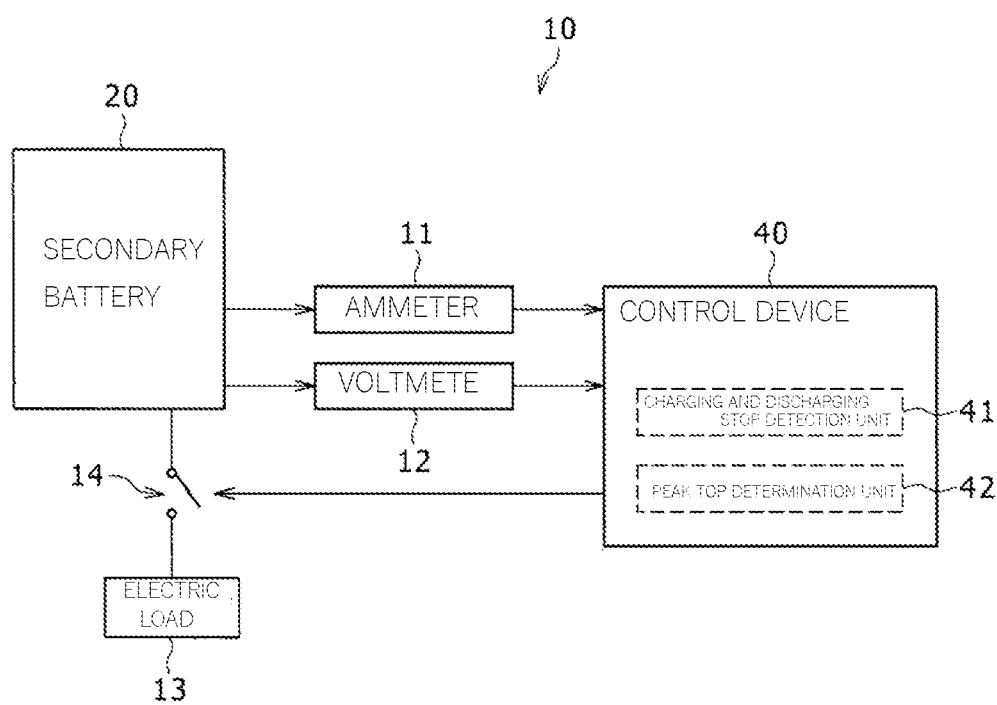
FIG. 1 is a block diagram showing a secondary battery system according to an embodiment of the present disclosure.

An embodiment of the present disclosure will now be described with reference to the drawings. A shape, a material, and a number described below are exemplary, and may be suitably changed according to the specification of the secondary battery. In the drawings, similar elements are assigned identical reference numerals for explanation.

A secondary battery system 10 according to an embodiment of the present disclosure will now be described with reference to FIG. 1. FIG. 1 is a block diagram showing the secondary battery system 10.

As shown in FIG. 1, the secondary battery system 10 is a system which controls charging and discharging of a secondary battery 20. The secondary battery system 10 comprises the secondary battery 20, a control device 40 which controls charging and discharging of the secondary battery 20, a voltage measurement device 11 which measures a voltage of the secondary battery 20, a current measurement device 12 which measures a charging current or a discharging current of the secondary battery 20, an electric load 13 connected to the secondary battery 20, and a selector switch 14 which turns connection between the secondary battery 20 and the electric load 13 ON and OFF.

The electric load 13 is for discharging the secondary battery 20, and a resistor is desirably used. The resistor desirably has a resistance value which allows discharge of the secondary battery 20 with a current value within a range normally used for the secondary battery 20.

In the secondary battery system 10 of the present embodiment, a structure with one secondary battery 20 is described, but the secondary battery system 10 is not limited to such a configuration. Alternatively, the secondary battery system 10 may have a battery pack in which a plurality of secondary batteries 20 are combined. In the secondary battery system 10 having the battery pack, the control device 40 controls charging and discharging of the battery pack, and the electric load 13 is connected to the battery pack.

Figure 2:
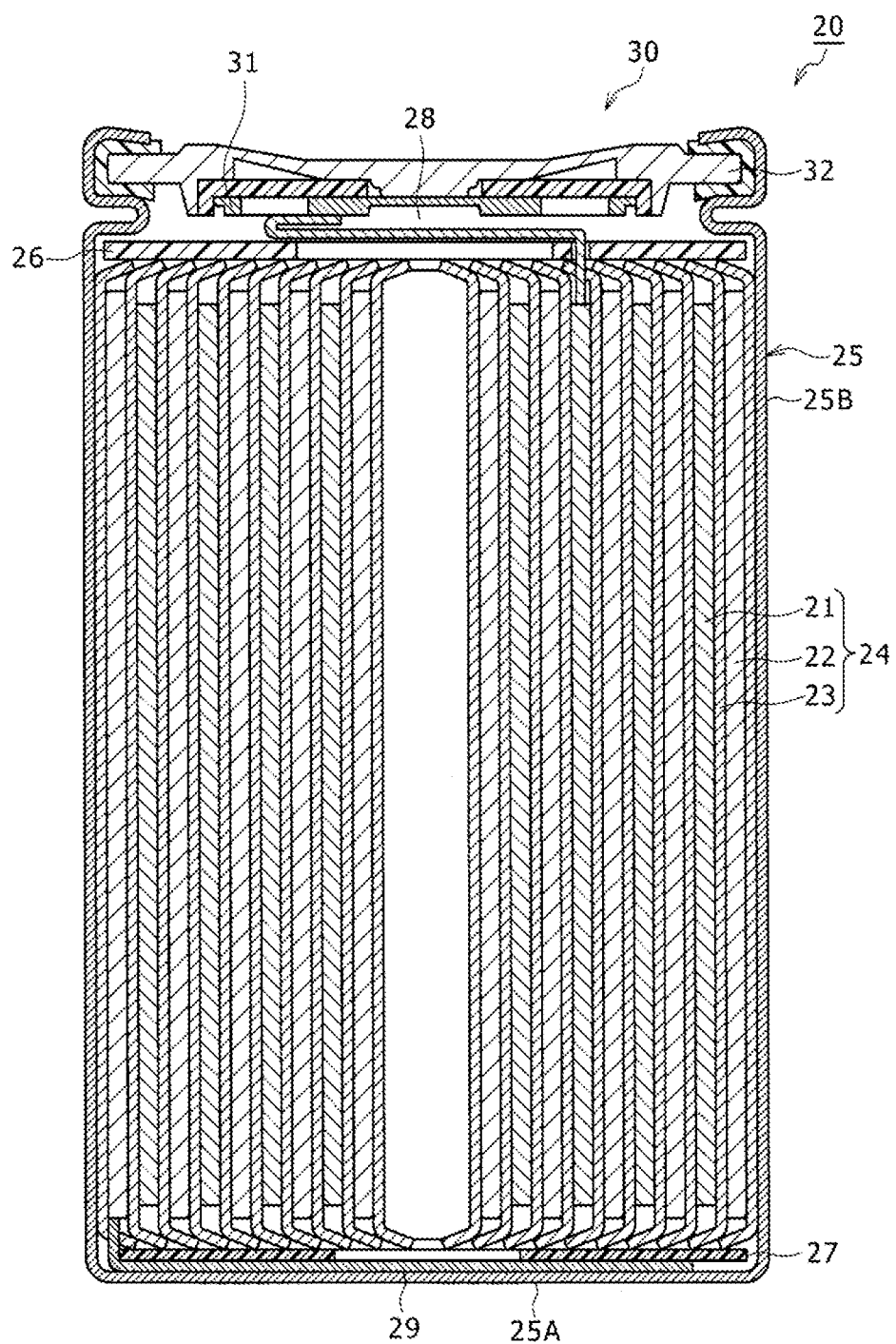
FIG. 2 is a cross-sectional diagram of a secondary battery according to an embodiment of the present disclosure.

The secondary battery 20 according to the embodiment of the present disclosure will now be described with reference to FIG. 2. FIG. 2 is a cross-sectional diagram showing the secondary battery 20.

As shown in FIG. 2, the secondary battery 20 is, for example, a circular cylindrical battery, and comprises an electrode assembly 24, an electrolyte, an outer housing can 25 which houses the electrode assembly 24 and the electrolyte, and a sealing assembly 30 which blocks an opening of the outer housing can 25. The electrode assembly 24 includes a positive electrode plate 21, a negative electrode plate 22, and a separator 23, and has a structure in which the positive electrode plate 21 and the negative electrode plate 22 are rolled in a spiral form with the separator 23 therebetween.

The positive electrode plate 21 comprises a positive electrode core and a positive electrode mixture layer formed over at least one surface of the core. For the positive electrode core, there may be employed a foil of a metal which is stable within a potential range of the positive electrode plate 21 such as aluminum and an aluminum alloy, a film on a surface layer of which the metal is placed, or the like. The positive electrode mixture layer includes a positive electrode active material, a conductive agent such as acetylene black, and a binder agent such as polyvinylidene fluoride, and is desirably formed over both surfaces of the positive electrode core. For the positive electrode active material, for example, a lithium-transition metal composite oxide is used. The positive electrode plate 21 can be produced, for example, by applying a positive electrode mixture slurry including the positive electrode active material, the conductive agent, the binder agent, or the like over the positive electrode core, drying the applied film, and compressing the dried film to form the positive electrode mixture layer over both surfaces of the core.

The negative electrode plate 22 comprises a negative electrode core and a negative electrode mixture layer formed over at least one surface of the core. For the negative electrode core, there may be employed a foil of metal which is stable within a potential range of the negative electrode plate 22 such as copper and a copper alloy, a film on a surface layer of which the metal is placed, or the like. The negative electrode mixture layer includes a negative electrode active material and a binder agent such as styrene-butadiene rubber (SBR), and is desirably formed over both surfaces of the negative electrode core. For the negative electrode active material, for example, graphite, a silicon-containing compound, or the like is used. The negative electrode plate 22 can be produced, for example, by applying a negative electrode mixture slurry including the negative electrode active material, the binder agent, or the like over the negative electrode core, drying the applied film, and compressing the dried film, to form the negative electrode mixture layer over both surfaces of the core.

For the electrolyte, for example, a non-aqueous electrolyte is used. The non-aqueous electrolyte includes a non-aqueous solvent, and an electrolyte salt dissolved in the non-aqueous solvent. For the non-aqueous solvent, esters, ethers, nitriles, amides, or a mixed solvent of two or more of these solvents may be used. The non-aqueous solvent may include a halogen-substituted product in which at least a part of hydrogens of the solvent described above is substituted with a halogen atom such as fluorine. The non-aqueous electrolyte is not limited to a liquid electrolyte, and may alternatively be a solid electrolyte. For the electrolyte salt, for example, a lithium salt such as $LiPF_6$ is used. No particular limitation is imposed on the type of the electrolyte, and the electrolyte may alternatively be, for example, an aqueous electrolyte.

The secondary battery 20 has insulating plates 26, 27 provided respectively above and below the electrode assembly 24. In the example structure shown in FIG. 1, a positive electrode lead 28 connected to the positive electrode plate 21 extends through a through hole of the insulating plate 26 toward the side of the sealing assembly 30, and a negative electrode lead 29 connected to the negative electrode plate 22 extends to the side of a bottom portion 25A of the outer housing can 25 through an outer side of the insulating plate 27. The positive electrode lead 28 is connected to a lower surface of a metal plate 31 which is a bottom plate of the sealing assembly 30 by welding or the like, and a rupture plate 32 of the sealing assembly 30 electrically connected to the metal plate 31 serves as a positive electrode external terminal. The negative electrode lead 29 is connected to an inner surface of the bottom portion 25A of the outer housing can 25 by welding or the like, and the outer housing can 25 serves as a negative electrode external terminal.

The control device 40 is a device which executes charging control and discharging control, details of which will be described below. The charging control is control to complete charging of the secondary battery 20 while avoiding a peak top charge rate range to be described below. The discharging control is control to complete discharging of the secondary battery 20 while avoiding the peak top charge rate range. The control device is equipped with a CPU serving as a calculation processing device which executes the above-described controls, and a ROM, a RAM, and a hard disk drive (HDD) serving as a storage device connected to the CPU.

As shown in FIG. 1, the control device 40 includes a charge/discharge stop detector 41 which detects a charge/discharge stop timing of the secondary battery 20, and a peak top judging unit 42 which judges whether or not a state of charge ("SOC") of the charge/discharge stop timing is within a peak top SOC range. In addition, the control device 40 is connected to the voltage measurement device 11, the current measurement device 12, and the selector switch 14.

The charge/discharge stop detector 41 has a function to detect a timing when charging of the secondary battery 20 is stopped. The timing when the charging of the secondary battery 20 is stopped includes a timing when the charging is stopped by judging that the secondary battery 20 is fully charged, and a timing when the charging is stopped after a predetermined time elapses. In addition, the charge/discharge stop detector 41 may detect a timing, when connection between the secondary battery 20 and a charger is shut out, as the timing when the charging of the secondary battery 20 is stopped.

The charge/discharge stop detector 41 also has a function to detect a timing when discharging of the secondary battery 20 is stopped. The timing when the discharging of the secondary battery 20 is stopped includes a timing when the discharging is stopped when the voltage of the secondary battery 20 is reduced to a predetermined value. In addition, the charge/discharge stop detector 41 may detect a timing, when connection between the secondary battery 20 and a battery load is shut out, as the timing when the discharging of the secondary battery 20 is stopped.

The peak top judging unit 42 has a function to judge whether or not the SOC at the charge/discharge stop timing of the secondary battery 20 detected by the charge/discharge stop detector 41 is within a set peak top SOC range (hereinafter, "peak top range"). The peak top range is a predetermined range of the SOC including an SOC which is a peak top in an SOC-dV/dQ curve, details of which will be described below.

Figure 3:
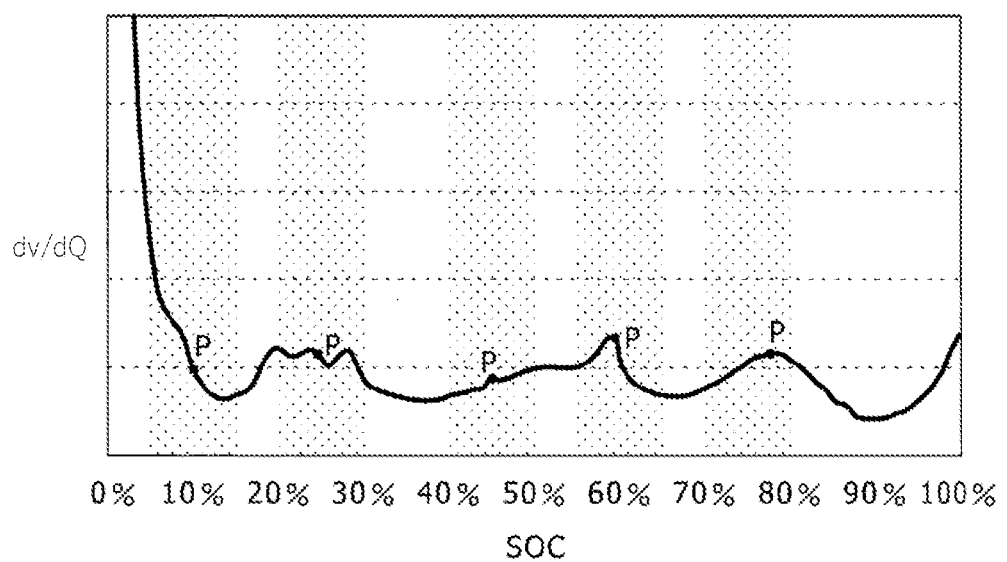
FIG. 3 is a graph showing an SOC-dV/dQ curve.

The peak top and the SOC-dV/dQ curve will now be described with reference to FIG. 3. FIG. 3 is a graph showing the SOC-dV/dQ curve.

In the SOC-dV/dQ curve shown in FIG. 3, the horizontal axis represents the SOC (%), and the vertical axis represents dV/dQ. The SOC is a percentage of the capacity Q of the secondary battery 20 with respect to a capacity of the secondary battery 20 in the fully charged state. The parameter dV/dQ is a differential value of the voltage V with respect to an amount of change dQ of the capacity Q of the secondary battery 20. The value of dV/dQ may be calculated, for example, from a Q-V curve obtained by measuring a change of the voltage V with respect to the capacity Q during charging or discharging.

The SOC-dV/dQ curve includes a plurality of peak tops. A peak top is a local maximum point in the SOC-dV/dQ curve. Positions and the number of the peak tops in the SOC-dV/dQ curve are determined according to the type of the electrode material such as the active material of the secondary battery 20. When charging or discharging of the secondary battery 20 is stopped at an SOC corresponding to the peak top and the secondary battery 20 is left in this state, self discharge easily occurs, and deterioration of the battery is promoted. As shown in FIG. 3, in the secondary battery 20, peak tops of dV/dQ are observed at SOCs of 10%, 25%, 45%, 60%, and 78% (P in the figure). In the present embodiment, a range of ±5% from the SOC corresponding to the peak top is set as a peak top range. The peak top range is set in advance in the RAM of the control device 40. The peak top range may be arbitrarily set according to the type of the electrode material such as the active material of the secondary battery 20.

Figure 4:
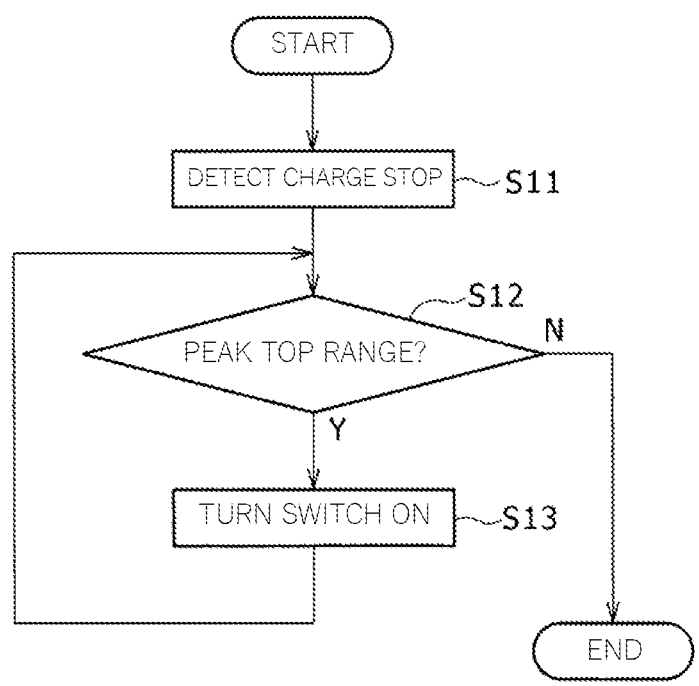
FIG. 4 is a flowchart showing a flow of charging control.

Charging control will now be described with reference to FIG. 4. FIG. 4 is a flowchart showing a flow of the charging control.

As described above, the charging control is control to complete the charging of the secondary battery 20 while avoiding the peak top range. With the charging control, when the charging of the secondary battery 20 is to be stopped in the peak top range, the charging can be completed while avoiding the peak top range by discharging the secondary battery 20 with the electric load 13.

In step S11, when the charge/discharge stop detector 41 detects the charging stop timing, the process proceeds to step S12. In step S12, when the peak top judging unit 42 judges that the SOC at the charging stop timing of the secondary battery 20 is in the set peak top range, the process proceeds to step S13. In step S13, the control device 40 turns the selector switch 14 ON, connects the secondary battery 20 and the electric load 13, and causes the secondary battery 20 to discharge. Steps S12 and S13 are repeated until the SOC at the charging stop timing of the secondary battery 20 falls out of the peak top range.

Figure 5:
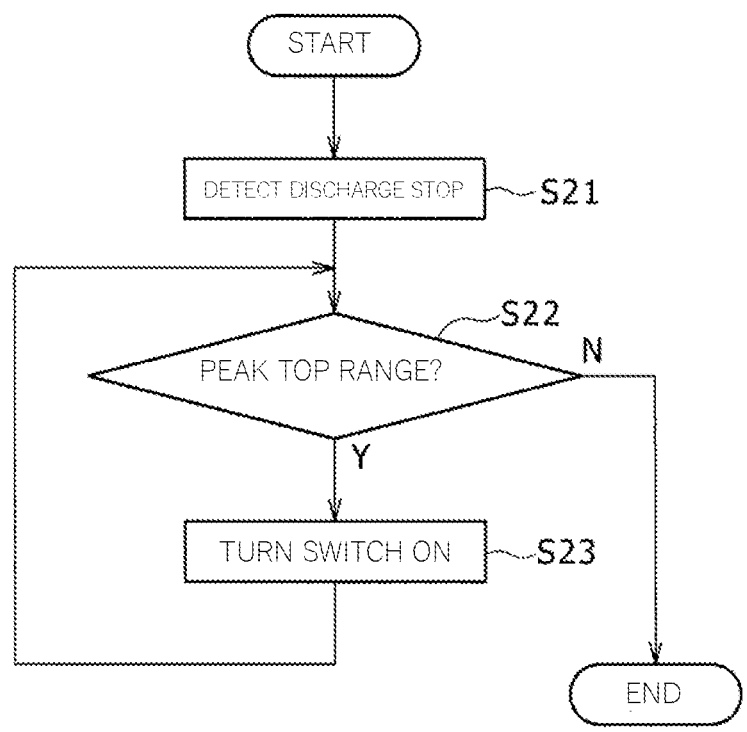
FIG. 5 is a flowchart showing a flow of discharging control.

Discharging control will now be described with reference to FIG. 5. FIG. 5 is a flowchart showing a flow of the discharging control.

As described above, the discharging control is control to complete the discharging of the secondary battery 20 while avoiding the peak top range. With the discharging control, when the discharging of the secondary battery 20 is to be stopped in the peak top range, the discharging can be completed while avoiding the peak top range by discharging the secondary battery 20 with the electric load 13.

In step S21, when the charge/discharge stop detector 41 detects the discharging stop timing, the process proceeds to step S22. In step S22, when the peak top judging unit 42 judges that the SOC at the discharging stop timing of the secondary battery 20 is in the set peak top range, the process proceeds to step S23. In step S23, the control device 40 turns the selector switch 14 ON, connects the secondary battery 20 and the electric load 13, and causes the secondary battery 20 to discharge. Steps S22 and S23 are repeated until the SOC at the discharging stop timing of the secondary battery 20 falls out of the peak top range.

Figure 6:
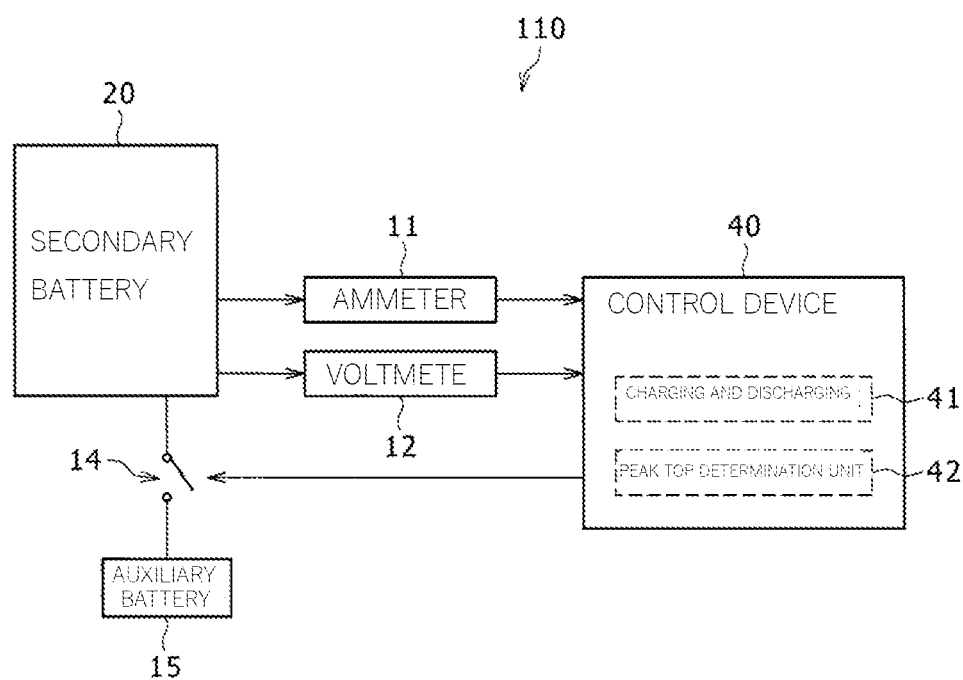
FIG. 6 is a block diagram showing a secondary battery system according to another configuration of an embodiment of the present disclosure.

A secondary battery system 110 according to another configuration of the present embodiment will now be described with reference to FIG. 6. FIG. 6 is a block diagram showing the secondary battery system 110.

As shown in FIG. 6, the secondary battery system 110 is a system which controls charging and discharging of the secondary battery 20. The secondary battery system 110 comprises the secondary battery 20, the control device 40 which controls the charging and discharging of the secondary battery 20, the voltage measurement device 11 which measures the voltage of the secondary battery 20, the current measurement device 12 which measures the charging current or the discharging current of the secondary battery 20, an auxiliary battery 15 connected to the secondary battery 20, and the selector switch 14 which turns the connection between the secondary battery 20 and the auxiliary battery ON and OFF.

The auxiliary battery 15 is for charging the secondary battery 20, and, for example, a secondary battery is desirably used. The secondary battery forming the auxiliary battery 15 is a battery of a smaller capacity than the secondary battery 20, and desirably has a capacity of about 20% of the capacity of the secondary battery 20. Alternatively, the secondary battery system 110 may have a structure in which the auxiliary battery 15 discharges the secondary battery 20. However, from the viewpoint of the control of the auxiliary battery 15, a structure is desirably employed in which the auxiliary battery 15 charges the secondary battery 20.

The control device 40 is a device which completes charging or discharging of the secondary battery 20 while avoiding the peak top range by charging the secondary battery with the auxiliary battery 15 when the charging or the discharging is to be stopped in the peak top range as described above.

With the charging control of the secondary battery system 110, when the charging of the secondary battery 20 is to be stopped in the peak top range, the charging can be completed while avoiding the peak top range by charging the secondary battery 20 with the auxiliary battery 15. Further, with the discharging control of the secondary battery system 110, when the discharging of the secondary battery 20 is to be stopped in the peak top range, the discharging can be completed while avoiding the peak top range by charging the secondary battery 20 with the auxiliary battery 15.

The present disclosure is not limited to the embodiment and the alternative configuration thereof as described above, and various modifications and improvements can be made within the spirit and the scope of the items described in the claims.

EXAMPLES

Example 1

[Production of Positive Electrode Plate]

As a positive electrode active material, aluminum-containing lithium nickel cobalt oxide ($LiNi_{0.88}Co_{0.09}Al_{0.03}O_2$) was used. 100 parts by mass of $LiNi_{0.88}Co_{0.09}Al_{0.03}O_2$ (positive electrode active material), 1.0 part by mass of acetylene black, and 0.9 parts by mass of polyvinylidene fluoride (PVDF) (binder agent) were mixed in a solvent of N-methyl pyrrolidone (NMP), to obtain a positive electrode slurry. A paste of the slurry was uniformly applied over both surfaces of an aluminum foil having a thickness of 15 Then, a thermal treatment was applied at a temperature of 100~150° C. in a dryer device which is heated, to remove the NMP, and then, the structure was compressed with a compression roller. A positive electrode plate after the compression was caused to contact a roll, which is heated to 200° C., for 5 seconds, to apply a thermal treatment, and the structure was cut to a thickness of 0.144 mm, a width of 62.6 mm, and a length of 861 mm, to produce a positive electrode plate.

[Production of Negative Electrode Plate]

As a negative plate active material, 95 parts by mass of graphite powders, and 5 parts by mass of a Si oxide were mixed. Then, 100 parts by mass of the negative electrode active material, 1 part by mass of CMC serving as a thickening agent, and 1 part by mass of styrene-butadiene rubber serving as the binder agent were dispersed in water, to prepare a negative electrode slurry. The negative electrode slurry was applied over both surfaces of a negative electrode current collector which is a copper foil having a thickness of 8 μm, to form a negative electrode applied portion. Then, after drying, the structure was compressed with a compression roller so that the negative electrode thickness was 0.160 mm, a thickness of a negative electrode mixture layer was adjusted, and the structure was cut to a width of 64.2 mm and a length of 959 mm, to produce a negative electrode plate.

[Preparation of Non-Aqueous Electrolyte]

To a mixed solvent in which ethylene carbonate (EC), dimethyl carbonate (DMC), and methyl acetate (MA) were mixed in a volume ratio of 20:75:5, 1.5 M of $LiPF_6$ was dissolved, to prepare a non-aqueous electrolyte.

[Production of Circular Cylindrical Battery]

First, a positive electrode lead formed from aluminum was attached to a positive electrode current collector, and a negative electrode lead formed from nickel-copper-nickel was attached to the negative electrode current collector. Then, a separator formed from polyethylene was provided between the positive electrode current collector and the negative electrode current collector, and the positive electrode plate and the negative electrode plate were rolled with the separator therebetween, to produce an electrode assembly. The, insulating plates were placed respectively above and below the electrode assembly, the negative electrode lead was welded to a battery case, the positive electrode lead was welded to a sealing plate having an inner-pressure actuating safety valve, and the structure was housed in an outer housing can. Then, the non-aqueous electrolyte was injected by a pressurization method into the outer housing can. Finally, an opening end of the battery case was fastened on the sealing plate with a gasket therebetween, to produce a secondary battery. A capacity of the battery was 3400 mAh.

[Definition of Peak Top Range]

In the SOC-dV/dQ curve of the battery, a range of ±5% from the SOC corresponding to the peak top was set as the peak top range.

[Assessment of Deterioration Rate]

Figure 7:
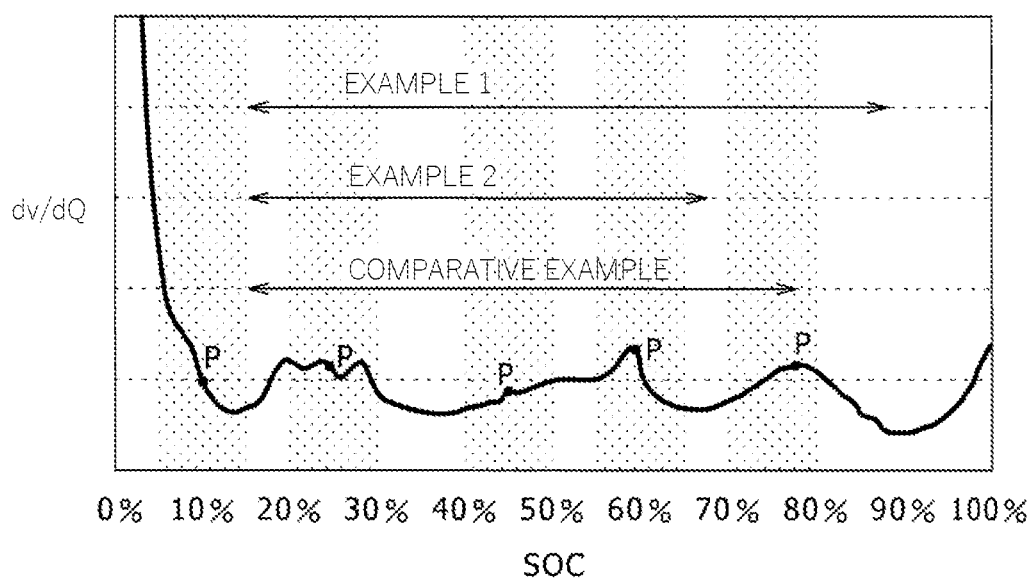
FIG. 7 is a graph showing a charge/discharge cycle in Examples.

As shown in FIG. 7, in a range from an SOC of 15% to an SOC of 90%, a charge/discharge cycle test was performed with a rate of 20 hour rate for each of charging and discharging. A total discharge capacity in this process was plotted on the horizontal axis, and a capacity maintenance percentage was plotted on the vertical axis. A deterioration rate was assessed from a slope of the capacity maintenance percentage.

Example 2

A battery was produced and the charge/discharge cycle test was performed similar to Example 1 except that the charge/discharge test was performed in a range from an SOC of 15% to an SOC of 65% as showed in FIG. 7.

Comparative Example

A battery was produced and the charge/discharge cycle test was performed similar to Example 1 except that the charge/discharge test was performed in a range from an SOC of 15% to an SOC of 78% as showed in FIG. 7.

TABLE 1 shows the deterioration rates for Examples 1 and 2 and Comparative Example, in a relative index with respect to the deterioration rate of Comparative Example 1, which was taken as 1.

TABLE 1

| | DETERIORATION RATE |
|---|---|
| EXAMPLE 1 (SOC15%-90%) | 0.29 |
| EXAMPLE 2 (SOC15%-65%) | 0.34 |
| COMPARATIVE EXAMPLE (SOC15%-78%) | 1 |

It was found that, in Examples 1 and 2 in which the charging and discharging were not stopped in the peak top range, the deterioration rate was about ⅓ of the deterioration rate in Comparative Example in which the charging is stopped in the peak top range. A cause of this is that, in the peak top range, a change of voltage per unit capacity is large, and an insertion/detachment reaction of Li is the primary reaction. It can be considered that, because of this, when the charge/discharge test is stopped in the peak top range, the state becomes unstable, the self discharge easily occurs, and the deterioration is promoted.

REFERENCE SIGNS LIST 10 secondary battery system, 11 voltage measurement device, 12 current measurement device, 13 electric load, 14 selector switch, 15 auxiliary battery, 20 secondary battery, 21 positive electrode plate, 22 negative electrode plate, 23 separator, 24 electrode assembly, outer housing can, 25A bottom portion, 26 insulating plate, 27 insulating plate, 28 positive electrode lead, 29 negative electrode lead, 30 sealing assembly, 31 metal plate, 32 rupture plate, 40 control device, 41 charge/discharge stop detector, 42 peak top judging unit, 110 secondary battery system

The invention claimed is:

1. A secondary battery system comprising:
a secondary battery having an electrode assembly in which a positive electrode plate and a negative electrode plate are layered with a separator therebetween, and a non-aqueous electrolyte;
an electric load connected to the secondary battery; and
a control device that completes, when a plurality of peak top state of charge (SOC) ranges, each of which peak top SOC ranges includes a SOC which is a peak top, are set on an SOC-dV/dQ curve on which dV/dQ, which is a differential value of an amount of change dV of a voltage V of the secondary battery with respect to an amount of change dQ of a capacity Q of the secondary battery, is plotted against the SOC which is expressed as a percentage of the capacity Q with respect to a capacity of the secondary battery in a fully charged state, and when charging or discharging is to be stopped in any one of the plurality of peak top SOC ranges, the charging or the discharging of the secondary battery while avoiding the plurality of peak top SOC ranges by discharging the secondary battery with the electric load.

2. A secondary battery system comprising:
a secondary battery having an electrode assembly in which a positive electrode plate and a negative electrode plate are layered with a separator therebetween, and a non-aqueous electrolyte;
an auxiliary battery connected to the secondary battery; and
a control device that completes, when a plurality of peak top state of charge (SOC) ranges, each of which peak top SOC ranges includes a SOC which is a peak top, are set on an SOC-dV/dQ curve on which dV/dQ, which is a differential value of an amount of change dV of a voltage V of the secondary battery with respect to an amount of change dQ of a capacity Q of the secondary battery, is plotted against the SOC which is expressed as a percentage of the capacity Q with respect to a capacity of the secondary battery in a fully charged state, and when charging or discharging is to be stopped in any one of the plurality of peak top SOC ranges, the charging or the discharging of the secondary battery while avoiding the plurality of peak top SOC ranges by charging the secondary battery with the auxiliary battery.

* * * * *